US00RE39302E

(19) United States
(12) Reissued Patent
Lanier et al.

(10) Patent Number: US RE39,302 E
(45) Date of Reissued Patent: Sep. 19, 2006

(54) INTELLIGENT HELP SYSTEM

(75) Inventors: Charles D. Lanier, Southlake, TX (US); Richard J. Wolf, Leander, TX (US); Leticia Villegas Butner, Phoenix, AZ (US)

(73) Assignee: Samsung Electronics Co., Ltd., Suwon (KR)

(21) Appl. No.: 09/375,867

(22) Filed: Aug. 17, 1999

Related U.S. Patent Documents

Reissue of:
(64) Patent No.: 5,103,498
Issued: Apr. 7, 1992
Appl. No.: 07/562,046
Filed: Aug. 2, 1990

(51) Int. Cl.
*G06F 15/00* (2006.01)

(52) U.S. Cl. ..... 706/58
(58) Field of Classification Search ..... 706/58
See application file for complete search history.

(56) References Cited

U.S. PATENT DOCUMENTS

| | | | | | |
|---|---|---|---|---|---|
| 4,156,284 | A | * | 5/1979 | Engeler | 364/862 |
| 4,648,044 | A | | 3/1987 | Hardy et al. | |
| 4,658,370 | A | | 4/1987 | Erman et al. | |
| 4,860,214 | A | | 8/1989 | Matsuda et al. | |
| 4,873,661 | A | * | 10/1989 | Tsividis | 364/807 |
| 4,885,757 | A | * | 12/1989 | Provence | 375/96 |
| 4,903,226 | A | * | 2/1990 | Tsividis | 364/807 |
| 4,931,926 | A | * | 6/1990 | Tanaka et al. | 364/419 |
| 4,942,367 | A | * | 7/1990 | Milkovic | 330/9 |
| 4,962,342 | A | * | 10/1990 | Mead et al. | 307/201 |
| 4,964,077 | A | | 10/1990 | Eisen et al. | |
| 4,988,891 | A | * | 1/1991 | Mashiko | 307/201 |
| 5,008,810 | A | * | 4/1991 | Kessel et al. | 364/200 |
| 5,021,988 | A | * | 6/1991 | Mashiko | 364/807 |
| 5,023,833 | A | * | 6/1991 | Baum et al. | 365/49 |
| 5,039,870 | A | * | 8/1991 | Engeler | 307/201 |
| 5,167,010 | A | | 11/1992 | Elm et al. | |
| 5,239,617 | A | | 8/1993 | Gardner et al. | |
| 5,485,544 | A | | 1/1996 | Nonaka et al. | |

FOREIGN PATENT DOCUMENTS

| | | | |
|---|---|---|---|
| JP | 6398741 | | 4/1988 |
| JP | 63-98741 | * | 4/1988 |
| JP | 63124148 | | 5/1988 |
| JP | 63-124148 | * | 5/1988 |

OTHER PUBLICATIONS

Erlandsen et al., "Intelligent Help Systems", *Information and Software Technology,* vol. 29, No. 3, Apr. 1987, pp. 115–121.*

Frakes et al., "Using Expert System Components to Add Intelligent Help and Guidance to Software Tools", *Information and Software Technology,* vol. 31, No. 7, Sep. 1989, pp. 366–370.*

Prager, et al., "Reason: An Intelligent User Assistant For Interactive Environments," IBM Systems Journal, vol. 29 No. 1, pp. 141–164, Jan. 1990.*

Imamiya et al., "Embedding Explanation Mechanism with User Interface", *SPIE* vol. 635 Applications of Artificial Intelligence III (1986), pp. 650–657, Apple MacIntosh Screen Prints.*

Parsayae et al., *Expert Systems for Experts,* pp. 66–67, 254–271, 1988.*

Covington et al., *Prolog Programming in Depth,* pp. 50–55, 1988.*

Graf, et al., "A Reconfigurable CMOS Neural Network," from 1990 IEEE Intl. Solid–State Circuits Conf., Feb. 15, 1990, 144–145.*

Kub, et al., "Programmable Analog Vector–Matrix Multipliers," IEEE Jour. Solid–State Circuits, vol. 25(1), Feb. 1990, pp. 207–214.*

Rossetto, et al., "Analog VLSI Synaptic Matrices as Building Blocks for Neural Networks," IEEE Micro, Dec. 1989, pp. 56–63.*

Schwartz, et al., "A Programmable Analog Neural Network Chip," IEEE Jour. Solid State Circuits, vol. 24(3), Apr. 1989, pp. 688–697.*

Alspector, et al., "Performance of a Stochastic Learning Microchip," from Advances in Neural Information Processing Systems I, Morgan–Kaufmann, 1989, pp. 748–760.*

Faggin, et al., "VLSI Implementation of Neural Networks," from an Intro. to Neural and Electronic networks, Academic Press, Inc., 1990, pp. 275–292.*

DeGloria, A., "The VLSI Technology and the Design of Neural Networks," First Italian Workshop Parallel Architectures and Neural Networks, Apr. 1988, pp. 119–127.*

Mead, et al., "Analog VLSI Implementation of Neural Systems," Kluaer Academic Publishers, 1989, pp. 57–83.*

Salem, et al., "A Feed Forward Network for CMOS VLSI Implementation," Midwest Symposium Circuits & Systems 1990, 489–491.*

Walker et al., "A CMOS Neural Network for Pattern Association," IEEE Micro, Oct. 1989, pp. 68–74.*

Siyilotti, et al., "A Novel Associative Memory Implemented Using Collective Computation," Conf. on Very Large Scale Integration, 1985, pp. 11–21.*

Graf, et al., IEEE International Solid–State Circuits Conf., 1990, "A Reconfigurable CMOS Neural Network", pp. 144–145.*

(Continued)

*Primary Examiner*—Todd Ingberg
(74) *Attorney, Agent, or Firm*—Knobbe, Martens, Olson & Bear LLP

(57) ABSTRACT

An intelligent help system which processes information specific to a user and a system state is described. The system incorporates a monitoring device to determine which events to store as data in an historical queue. These data, as well as non-historical data (e.g., system state), are stored in a knowledge base. An inference engine tests rules against the knowledge base data, thereby providing a help tag. A display engine links the help tag with an appropriate solution tag to provide help text for display.

23 Claims, 14 Drawing Sheets

OTHER PUBLICATIONS

"Visual Programming Environments Paradigms and Systems", by Ephraim P. Glinert, IEEE Computer Society Press Aug. 31, 1990.*

"Extending State Transition Diagrams for the Specification of Human–Computer Interaction", by Anthony I Wasserman, pp. 100–114, Aug. 1985.*

"Visual Programming Languages A Perspective And A Dimeensional Analysis", by Nan C. Shu, pp. 41–58, Aug. 19885.*

"Applications and Extensions of SADT", by Douglass T Ross, pp. 147–156, from IEEE publication Computer Apr. 1985.*

Helm, "Tandy Deskmate Intelligent Help Expert System," 1989.

M. Stehouwer and J. Bruggen, "Performing Interpretation in an Intelligent Help System," Proc. 6$^{th}$ Annual ESPRIT Conf. (Nov. 27–Dec. 1, 1989), pp. 248–257.

J. Silber, "Pal: An Intelligent Help System," Proc. 3$^{rd}$ Int'l Conf. on Indus. & Engin. Appli. of Artificial Intelligence & Expert Systems (Jul. 1990), pp. 882–889.

John M. Carroll and Jean McKendree, Interface Design Issues for Advice–Giving Expert Systems, 30 Comm. of the ACM 14–32. Jan. 1987.

* cited by examiner

INTELLIGENT HELP SYSTEM

Matter enclosed in heavy brackets [ ] appears in the original patent but forms no part of this reissue specification; matter printed in italics indicates the additions made by reissue.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

This invention relates to help systems for computers; more specifically, it relates to help systems that aid a user of a computer by providing context sensitive help.

BACKGROUND OF THE INVENTION

In order to operate a computer effectively, a user must master a number of commands and data formats. One usually accomplishes this by spending hours reading printed user documentation and/or by using trial and error techniques.

Computer-aided help system have been developed to provide on-line assistance to computer users. In response to a request by a user, those systems display help information on the display screen of the computer. Simple help systems always start with the same display, regardless of the circumstances, and the user must enter specific information to find help for his or her particular situation. More advanced help systems display context-sensitive help. Context-sensitive help systems determine what particular part of an application program the user is in. Then help information is displayed that is relevant to this user location.

While such context-sensitive help systems represent an advancement over simple help systems, they have numerous limitations. Such systems are usually tightly coupled to an application program; they must rely on the application program to keep track of and store the context. Further, since these systems are limited to displaying help information based upon program location, they will always return the same help information for a given location regardless of how the user got there. While such systems provide the convenience of on-line help, the help information they provide is nothing more than a user's manual correlated with a given program screen or function. As a result, these help systems tend to be of limited utility to the user who cannot specifically identify the problem or who has "lost his way."

SUMMARY OF THE INVENTION

The invention recognizes a need for an intelligent help system which processes information specific to the user's history, such as tasks he or she has successfully executed (and how many times) or has had previous help with, and information which defines a state of a machine and a state of a programmed application.

According to the invention, an intelligent help system for aiding the user of a computer program is provided by maintaining an historic queue and using artificial intelligence techniques to select help information based on user-directed events and the current state of the system. In particular, user-directed activities are monitored and stored in the historical queue inside a knowledge base. System states are also monitored and stored. The knowledge base is then used by an inference engine to isolate the specific kind of help that a user needs. Thus, the user is given assistance upon request which is appropriate to that user's level of understanding or experience and the current activities that he or she has executed.

FIG. illustrates the operation of the display engine.

DETAILED DESCRIPTION OF THE PREFERRED EMBODIMENT

Figure 1:
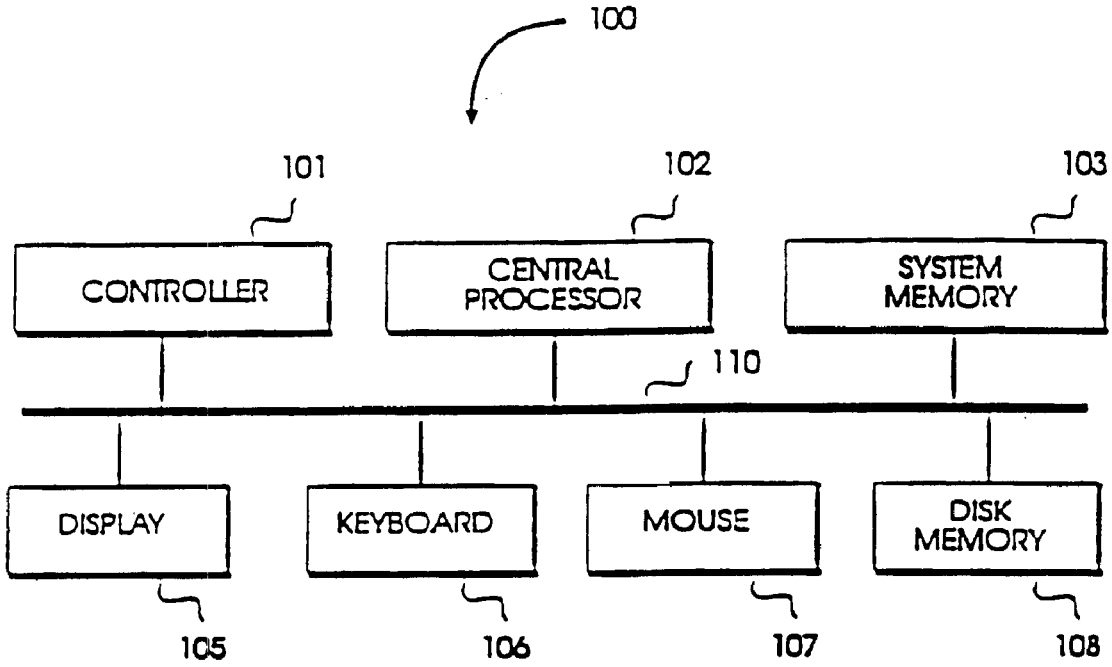
FIG. 1 is a block diagram of a computer system in which the invention may be embodied.

Referring to FIG. 1, the preferred embodiment of the invention is implemented on a computer system 100 having a central processor 102, a system memory 103, a display device 105, a keyboard 106, a mouse 107, a disk memory 108, an I/O controller 101, and interconnecting means 110, such as a system bus. In the preferred embodiment, a Tandy 1000 series computer (Tandy Corporation of Ft. Worth, Tex.) is used as the system 100.

Figure 2:
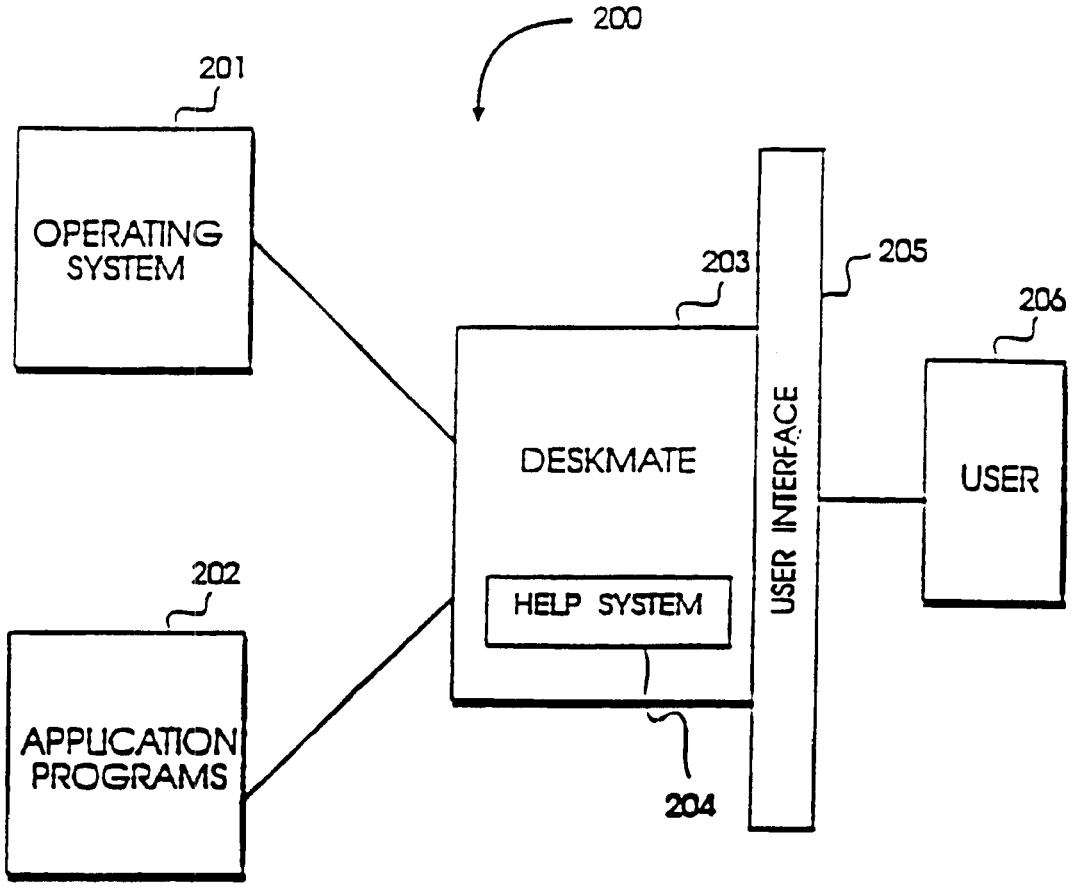
FIG. 2 is a block diagram of a computer software system used in the preferred embodiment.

Referring to FIG. 2, a computer software system 200 is shown for programming the computer system of FIG. 1. Software system 200 is stored in system memory 103 and on disk memory 108. System 200 programs the central processor 102 to display a graphic user interface (GUI) on display monitor 105. In the preferred embodiment, help system 204 is implemented in the Tandy DeskMate environment 203 which provides a software interface 205 between a user 206, a computer application 202, and an operating system 201. It will be apparent, however, that one of ordinary skill in the art, informed by this specification, could implement the invention in other operating environments.

In the preferred embodiment, an artificial intelligence (AI) paradigm is used to deal with knowledge which may be vast and uncertain, leading to multiple solutions for a given situation. An AI model has the ability to learn or infer more knowledge from what it already knows. Thus, if a user requests help and the help system cannot reach a solution, the system can get further information from the user and then remember the situation; the next time that that situation occurs a solution can be given without querying the user again.

Figure 3A:
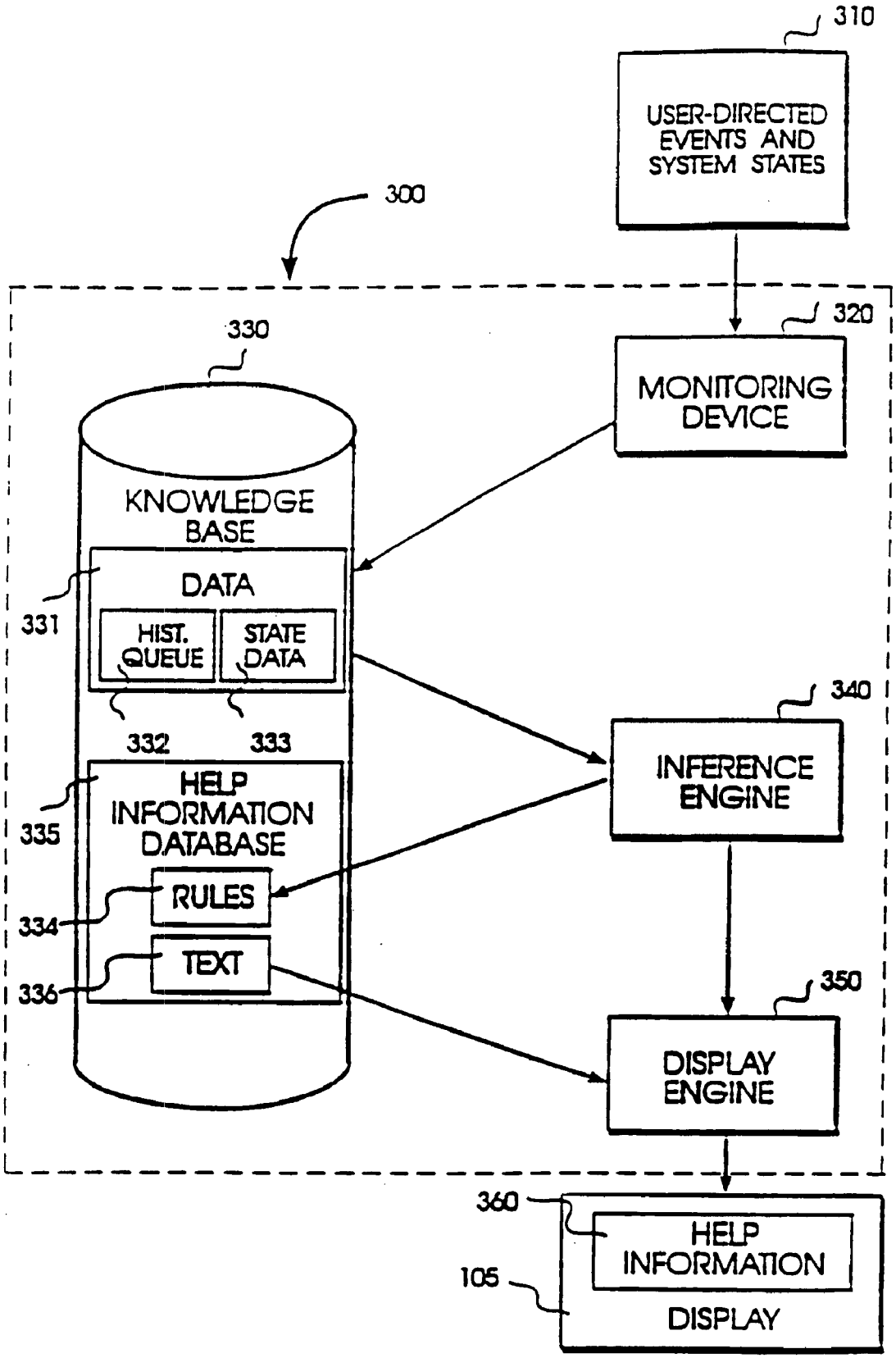
FIG. 3A illustrates the processing of user-directed events and system states into help information.

Referring to FIG. 3A, help system 300 of the preferred embodiment comprises a monitoring device 320 for collecting data generated in response to user-directed events and system states 310, a knowledge base 330 for storing data 331 along with a help information database 335 used to determine the best help to give, an inference engine 340 for interpreting data 331 and help information database 335 in knowledge base 330, and a display engine 350 for presenting appropriate help information 360 on display device 105. Data 331 comprises an historical queue 332 and a state data 333, while help information database 335 comprises a plurality of rules 334 and text 336.

Figure 3B:
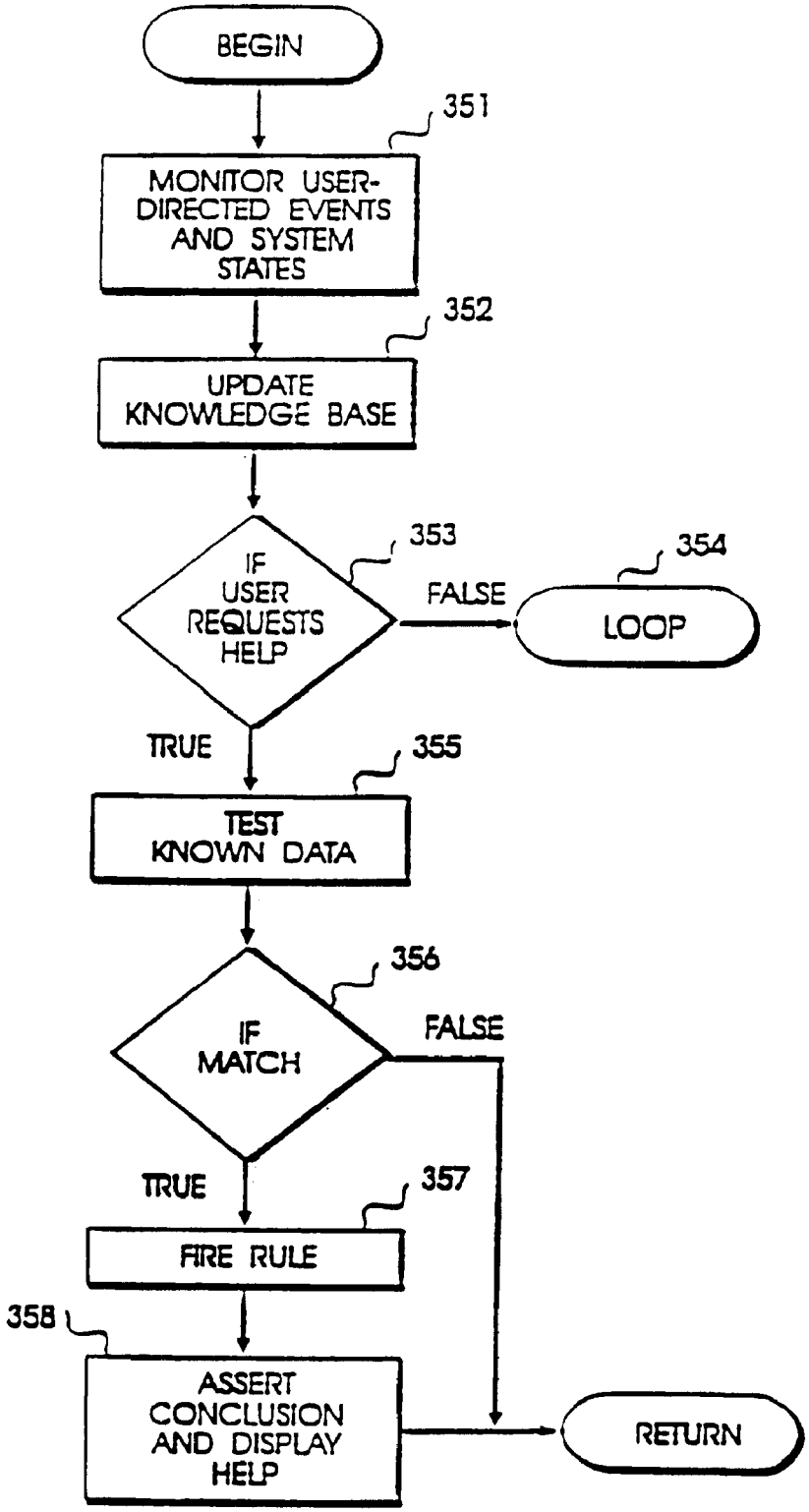
FIG. 3B is a flow chart of the general methods of the help system.

FIG. 3B is a flow chart illustrating the general methods of help system 300. In step 351, user-directed events and system states are monitored. User-directed events are the activities that a user performs in an application program, for example, saving a file in a paint application or copying a block of text in a word-processing application. The system state comprises a machine state and an application-specific state. In step 352, the information collected in step 351 is stored as facts or data 331 of knowledge base 350. Specifically, sequential user-directed events are stored in historical queue 332 and knowledge about the system is stored as state data 333. In step 353 if a user requests help (e.g., pressing F1 key), then in step 355 inference engine 340 tests known data 331 against help system rules 334. However, if no help is requested in step 353, the routine loops back to the monitoring step 351.

Knowledge base 330 stores heuristics in the form of rules. Rules 334, such as those used in step 355, are premise-conclusion statements predefined by an application developer which guide inference engine 340 in selecting an output. For example, suppose a user is in a Text (word processing) listbox and no files are selected. A rule that would check this is:

```
if
    no files
    running.listbox TEXT
then
    help running text
```

This rule attempts to "fire" by proving its premise, "no files." First, it checks the known data 331 in knowledge base 330. If this is not in data 331, it checks for other rules with this premise as their conclusion. Next, if in step 356 a match is found, the corresponding rule fires in step 357. In step 358, in response to the particular rule that fired, a conclusion is asserted and appropriate help information 360 is displayed. The format of rules in this embodiment is described hereinafter with reference to FIG. 8.

Monitoring device 320 and its functions will now be described in detail. While monitoring device 320 tracks or monitors user input, it has processing capabilities. It may assert data in knowledge base 330 after identifying a sequence of one or more events or states. It may remove or retract data concerning states which are no longer true, or reasserts a new value for old data. It keeps track of the number of times an activity has successfully been completed by a user.

Monitoring device 320 monitors different types of information, including machine states, application specific states, and historical information. The machine state includes current system level, such as within an application or accessory, running a component, or at the desktop interface. An accessory is an application that may "pop up" over another application. Examples of accessories include a pop-up calculator, calendar, or alarm. A component is a graphic element that a user interacts with to display and accept information from a user. For example, the components in a dialogue box include radio buttons, push buttons, and edit fields. The menubar is also a component.

Monitoring device 320 also monitors application-specific states (application specifics), including information unique to an application, and component states, including information within the current machine state which is either application specific or general; since components such as radio buttons are generated in the same way, regardless of whether the component is used at the application level or general level, information about component states is also generated in a uniform manner. For example in all applications which have a menubar, choices are obtained by selecting an item off the menu.

Monitoring device 320 also tracks historical information which indicates the completion of a task for which help has been defined. This data is stored in historical queue 332. A successful completion indicates that the user no longer needs help in performing that task. More specific help information, rather than general information, can be given as the user gains more experience with a program.

The structure of historical queue 332 will now be described in detail. For each entry, an entry type is stored. For example, when a user runs a dialogue box, monitoring device 320 adds a dialogue box entry (CMP_DLG_BOX) into historical queue 332 and then stores corresponding editfield, listbox, radiobutton, iconbutton and checkbox information. Each entry into historical queue 332 can be of variable length, depending on the type of entry made. A unique "return code" is assigned to each component, thus facilitating the distinction between components. A far pointer to an entry's structure (e.g., dialogue box, component, and/or menubar structures) is stored to allow direct access to that structure. Following this, dialogue and component information is copied. The format used can be of variable length. A subentry flag is defined to indicate when there is a subentry. For example, a component may still be running while the menubar is processed, therefore, the menubar is part of a single entry. If the flag is set to a value of true, then any subentry data is stored. Another flag is defined to indicate the user keystrokes that occurred during the entry. This enables the system to determine, for example, whether the user has begun entering data into a dialogue box, or if he chose help immediately. The name of the box and menu entries, such as DLGBOX, MSGBOX, LISTBOX, or MENU, is stored to distinguish one box from another. A third flag is defined to indicate the user keystrokes that occurred before invoking help. This enables the system to determine what the user was doing in the application.

Variables which manipulate historical queue 332 are defined as follows:

ihm_HelpQ: the 500 byte queue, there is one in each task data area of the Core Service Routine (CSR).

ihm_TOP: the physical start of the HelpQ buffer.

ihm_ENDQ: the physical end of the HelpQ buffer.

ihm_start_ptr: pointer to the first entry in the queue, (which is last historically).

ihm_cur_ptr: pointer to the first byte of the last entry in the HelpQ.

ihm_end ptr: pointer to the last byte of data entered into the HelpQ.

ihm_save_ptr: the ptr value of the last entry made, saved because an invalid ptr is entered into the HelpQ as a NULL.

ihm_menu_ptrl: double word pointer to the current menubar. Updated each time mb draw is called.

The data structure of the queue may be summarized as follows:

dw— offset of previous entry
dw— type
dw— return code
dw— struct ptr— offset
dw— struct ptr— segment
db— # subentries
db— length of name
db(? )— name of dlg box, msg box, menu, listbox
db— keyflag— any mouse or key events before entry?
db(? )— subentry data
db— keyflag— any mouse or key events during entry?
dw— length of information copied or 0

In the preferred embodiment, the monitoring of information occurs at different places in software system 200. All state changes that result in the execution of dialogue and message boxes are monitored. In DeskMate environment 203, commands are entered by the user through a menubar and are processed by event interpreters, which check for menubar changes. In addition, the application programs themselves may indicate state changes in their respective working areas.

DeskMate environment 203 is divided into the following hierarchy of level changes, thus simplifying the monitor's task of updating information:

1. Top Level to application/accessory or menubar/component;
2. Application to accessory or menubar/component or return to top level;
3. Accessory to menubar/component or return to application or top level.

Specific information is required as to the following states: application is running or has quit; which application is running; accessory is running or has quit; which accessory is running; dialogue box is running or has quit; message box is running or has quit; component is running or has quit; menubar menu has been pulled down or has returned; user at desk top; if user not at top level, the level attained prior to the current one. The variable "level" takes the value of DeskTop, Menubar, Dlg_box, Message_box, Info_box, or Component. The monitoring can obtain the state changes by getting the address calls from DeskMate environment 203 which indicate a function call to an application program or resource.

Figure 4:
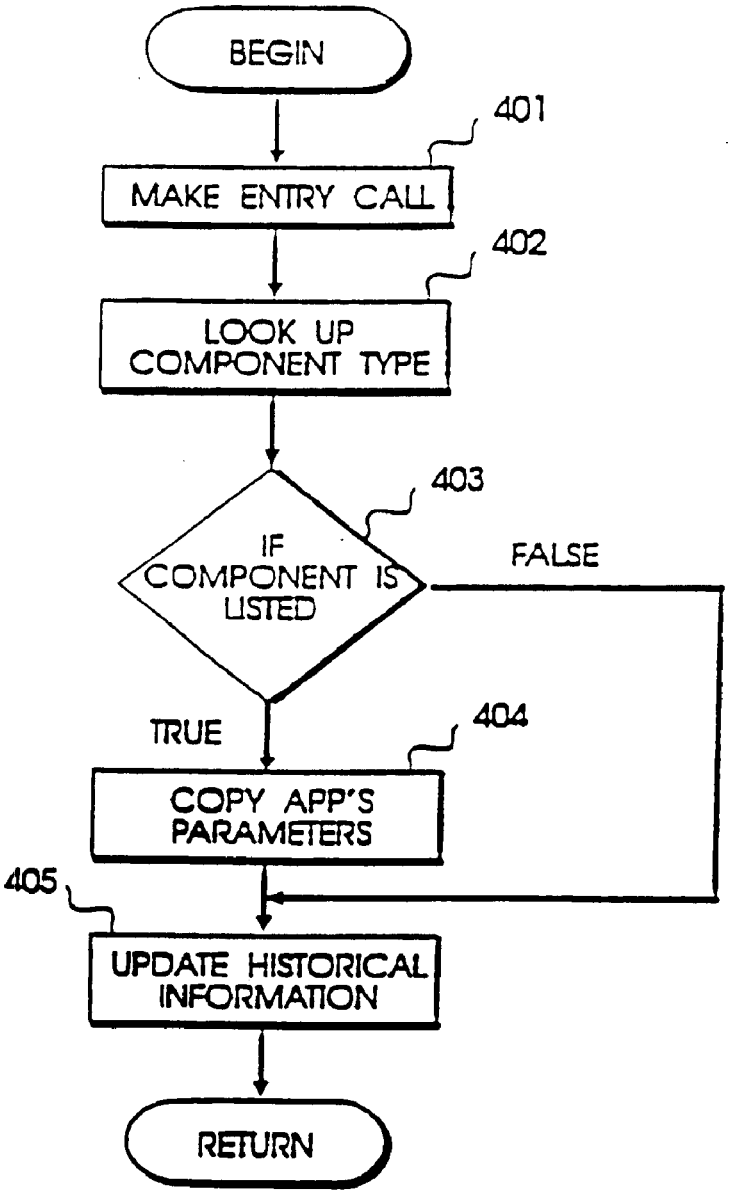
FIG. 4 is a flow chart of a query by the monitoring device.

FIG. 4 illustrates how monitoring device 320 queries for the address of calls it is interested in. In DeskMate environment 203, applications call core service routines (CSR) to run components and dialogue, information, and message boxes. A menubar interpreter handles the processing of the menubar. Therefore, independently of an application, the calls which change the structures that the application is using can be monitored to keep track of information changes.

Thus, the steps are as follows. In step 401, an entry call is made to a core service routine. In step 402, the component type is identified and then compared with a list of components that monitoring device 320 is interested in. In step 403, if the component is listed in the table, then in step 404, monitoring device 320 takes the application's parameters and its structure pointer to copy data from within the application's structures. The structures are not modified. Upon exit of the service and before control is returned to the application, at step 405 monitoring device 320 again accesses data in the structures, this time for the purpose of historical information updates.

Since a distinction may be made between applications and accessories, a variable "program" is defined to indicate which particular program is running. Program takes the value of the program name, which is the same identifier for help information database 335 associated with the application or accessory.

Two event interpreters pick up menubar changes. The menu selected is important for the state, while the item returned is important for the history. A high-priority event interpreter picks up the menubar changes when help is requested, and a low priority event interpreter will make all changes from the menubar's return code. The high-priority interpreter examines events first before any further processing by the DeskMate system. On the other hand, the low-priority interpreter examines events after they are processed by the DeskMate system.

Figure 5A:
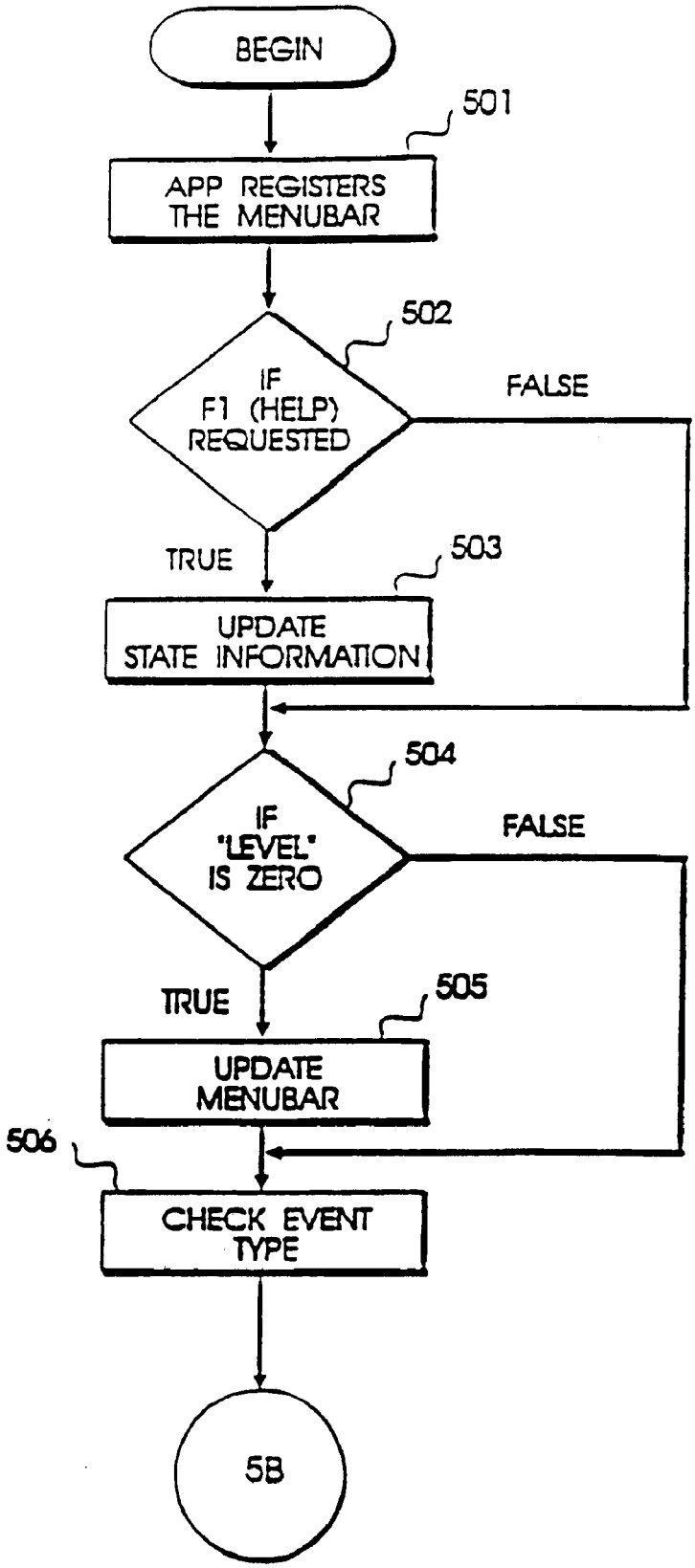
FIGS. 5A–B are a flow chart of the methods of the event interpreters.
Figure 5B:
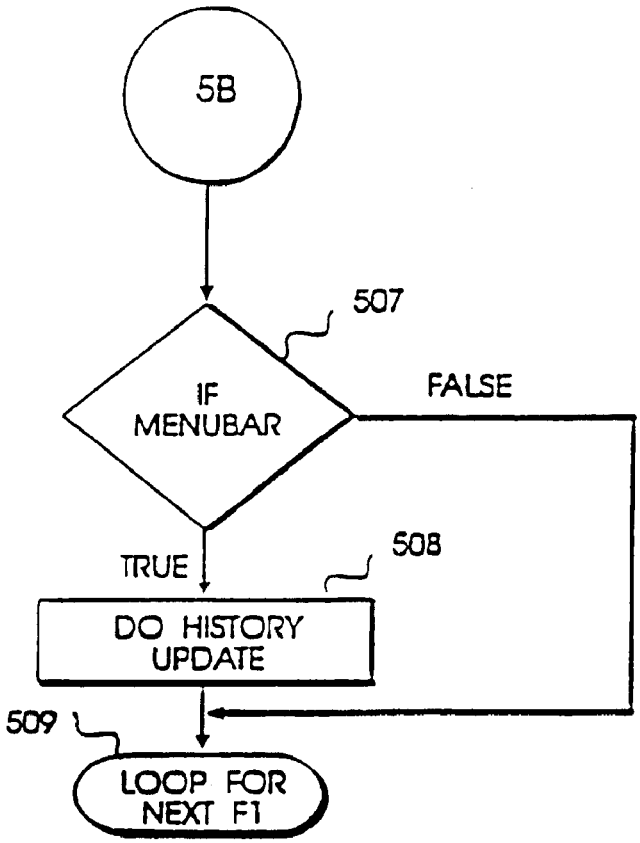

FIGS. 5A–B illustrate the method of the events interpreters. In step 501, the application registers the menubar with monitoring device 320. At step 502, if the user has selected the F1 (help) key, then at step 503 the state information is updated according to what level the system is operating at (indicated by the variable "level"). If level equals zero in step 504, then the menubar is the last thing changed, therefore a menubar update is needed. At step 505, the menubar interpreter makes an update. But if "level" is not zero, then step 505 is skipped. At step 506, the low priority interpreter checks the event type. If, at step 507, it is menubar (level=menubar), then in step 508 the low priority interpreter does a history update, performed by taking the return code and comparing its value with the menubar menus. The string corresponding to the return code is the item of interest. At step 509, the routine loops back to step 501 to await another F1 keystroke.

The rules associated with the functions of the above components are written such that if a component has a title string, this string is used to identify its help source. If a component does not have a title string, then the name of the component will be used as its identifier.

Since all applications use the features of DeskMate environment 203, standard representation of data 331 and rules 334 is possible. For example, the following variables can be used to indicate events and states:

menu.selected
menu.item.selected
dlg.box.running
dlg.box.focus
msg.box.running
cmp.running
listbox.item.selected
checkbox.item.selected Application-specific information is obtained by having the application assert data into the current state data 333 in knowledge base 330. The application accomplishes this by making a call to an "Assert" function with the parameters "variable" and "value," which are pointers to strings. The variable should match a variable in the rule premise, i.e., the rule must be defined beforehand. An application should assert any historical information related to its unique state configuration. Application data are removed from the current state data 333 by the application once those data are no longer true by calling a "Retract" function. Although the applications may directly assert data into knowledge base 330, they do not determine what help to give. Instead, they supply the inputs for this determination.

Historical information is obtained by using a user's I.D. to index the user's unique historical information. This historical information is updated at the end of a task completion. For example, when the user has successfully executed a copying function, monitoring device 320 recognizes this by checking that the user has selected "text" and then selected "copy" from the file menu. Having determined that the user has mastered this task, monitoring device 320 updates the user's historical information. For historical information associated with the application's specific data, the application updates the information itself by calling the function UpdateHistory with a parameter pointing to a string representing the activity just completed.

Figure 6:
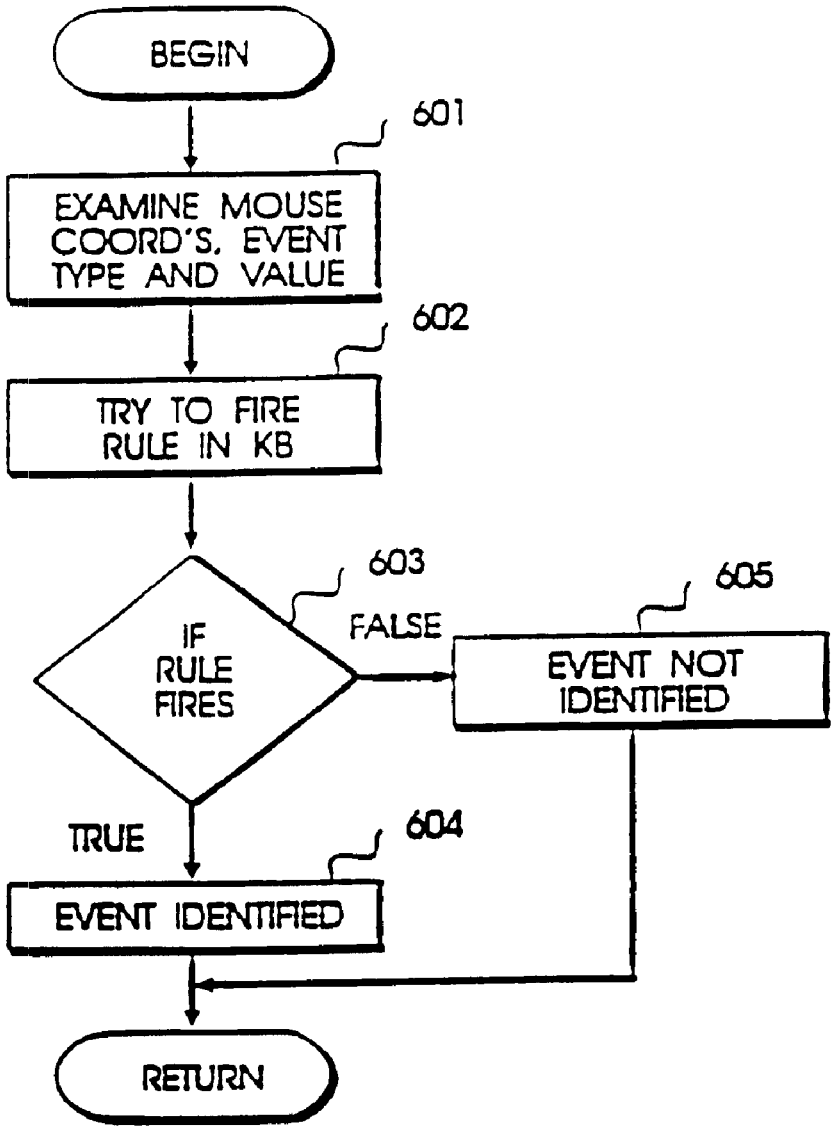
FIG. 6 is a flow chart of the methods for processing events.

FIG. 6 summarizes the method for processing the events from the event interpreters. At step 601, events are processed by examining the mouse coordinates and event type and value. In step 602, events are identified by trying to "fire" or trigger a rule that would make a data assertion or retraction into knowledge base 330. These rules represent all conditions that must be true for data to be asserted or retracted. If a rule fires in step 603, then the event is identified, step 604. If the rule does not fire, then the event is not identified, step 605.

Figure 7:
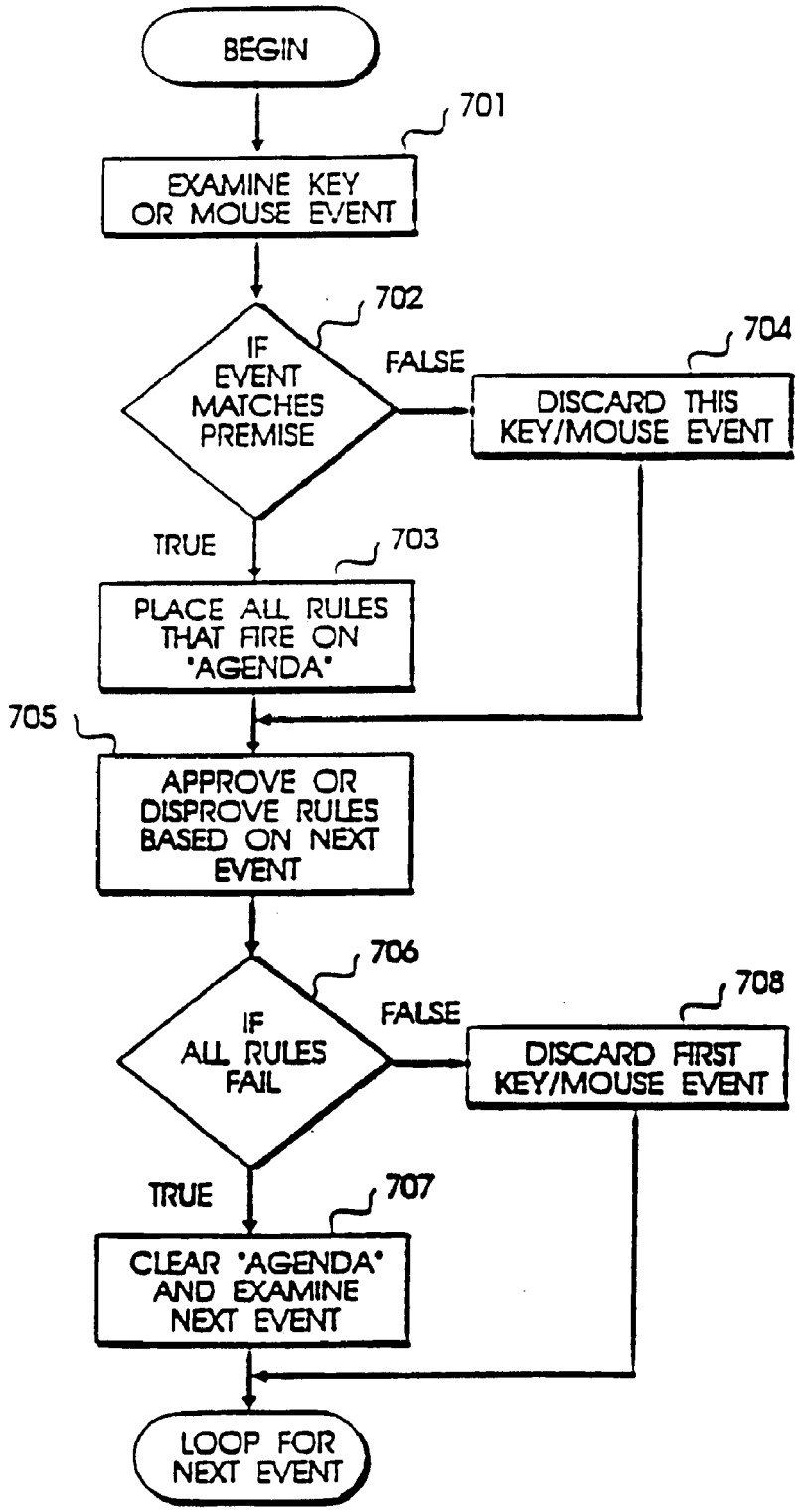
FIG. 7 is a flow chart of the methods for identifying a task.

FIG. 7 illustrates the approach used in step 602 (FIG. 6) to identify a task (sequence of events). In step 701, a key or mouse event is examined. In step 702, if the event does not match the first premise line in any rule associated with the system level, then the event is discarded in step 704. Otherwise, in step 703, all rules that fire are placed on an Agenda, which represents the most likely task(s). At step 705, the rules are approved or disproved by examining the next key or mouse events that come in. If all the rules in the Agenda fail at step 706, then the first key analyzed is discarded and the next key is used to search for new rules, step 708; otherwise in step 707, the Agenda is cleared and the procedure loops to step 701 to examine the next key/mouse event.

Since the information monitored is dependent upon the machine state level, the data generated are divided according those levels. Monitoring device 320 attempts to assert data which apply to a given level. Each application or accessory can be considered as a distinct object (as a level) which performs certain activities, some of which are common to other objects. Therefore, it is convenient to divide the monitor's data structure into "frames." A frame contains the activities that each application is capable of, with current values and historical information. The frames have slots for storing the data used by the rules or a pointer to another frame.

In the preferred embodiment, user input and system state are analyzed by monitoring device 320 for passage as data to knowledge base 330 for storage. Commands are defined for controlling this flow of data to and from knowledge base 330. Data are stored in frames through the Assert command. Old information is deleted with the Retract command. A query is made to knowledge base 330 to attain information through a Query command. Previous data are asserted by a Reassert command.

Figure 8:
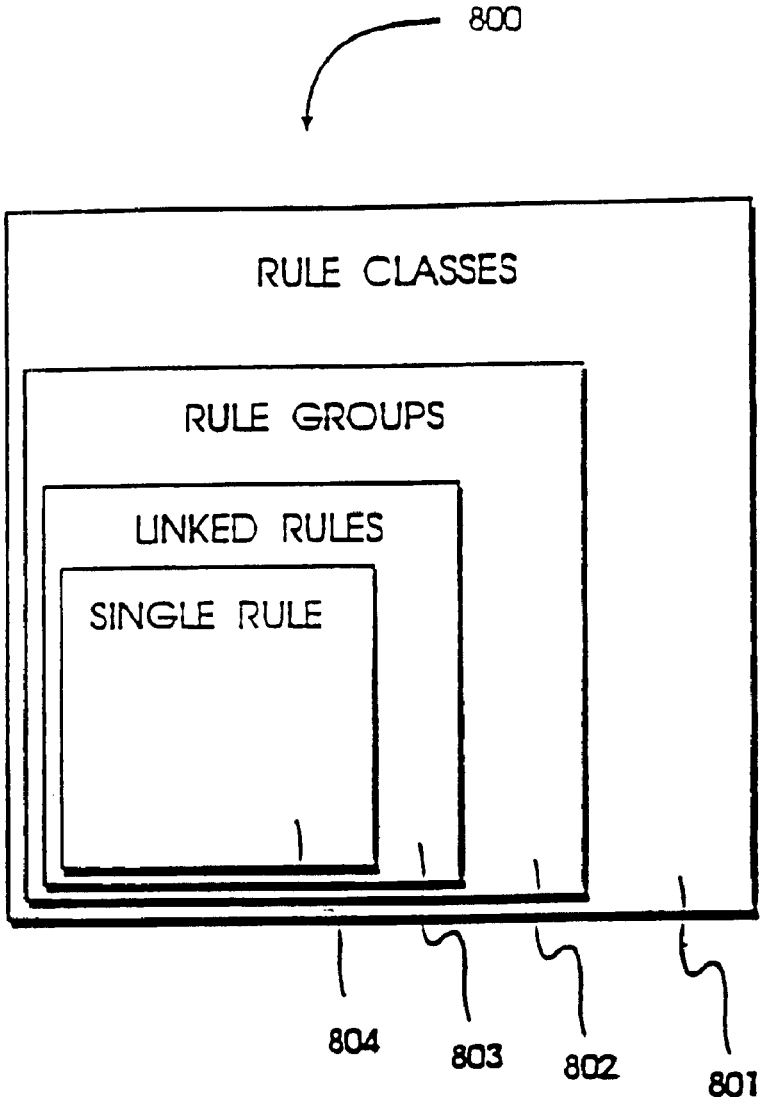
FIG. 8 illustrates the rule taxonomy of the invention.

Knowledge base 330 comprises formal (traditional data base information) and informal (heuristic) knowledge which is rule based. FIG. 8 demonstrates the rule taxonomy. At the lower level of the rule hierarchy 800 is a single rule 804 defining a pattern-to-action goal. The pattern is known as the left-hand side of a rule, while the action is the right-hand side. The rules use the common logical operators AND, OR, and NOT, as well as Boolean operators such as IF, THEN, and ELSE. In addition, the key word TEST indicates that a comparison needs to be made. The right-hand side of a rule can have an ELSE clause, an assertion, a retraction, another rule, or a procedure call. For example, in the rule:

IF a THEN b, ELSE c b could be an assertion which would add data b into data 331; multiple data assertions are possible. A retraction would delete data b from data 331:

IF a THEN (RETRACT b).

"Another rule" may be imbedded as follows:

IF a then b, IF (TEST (=bc)) THEN d.

An example of a procedure call would be:

IF a THEN (CALL Help Tutorial(a)).

Linked Rules 803 are a linking between rules which share the same conclusion. This is a design implementation intended to make the inference process easier by knowing alternative solution paths. Rule Groups 802 group rules with a common purpose. For example, rules with a conclusion indicating what specific help to give are all rules determining the goal state. A group can have an (optional) priority identifier so the most important or most specific rules can be tried out first when searching. This does not imply that a rule group will be left out of a search. Rules Classes 801 are a further conceptualization of rules. They separate individual knowledge bases, each having a unique identifier by which it is distinguished. This identifier can be used by a set of control rules which use the machine state information to indicate knowledge base access.

Figure 9:
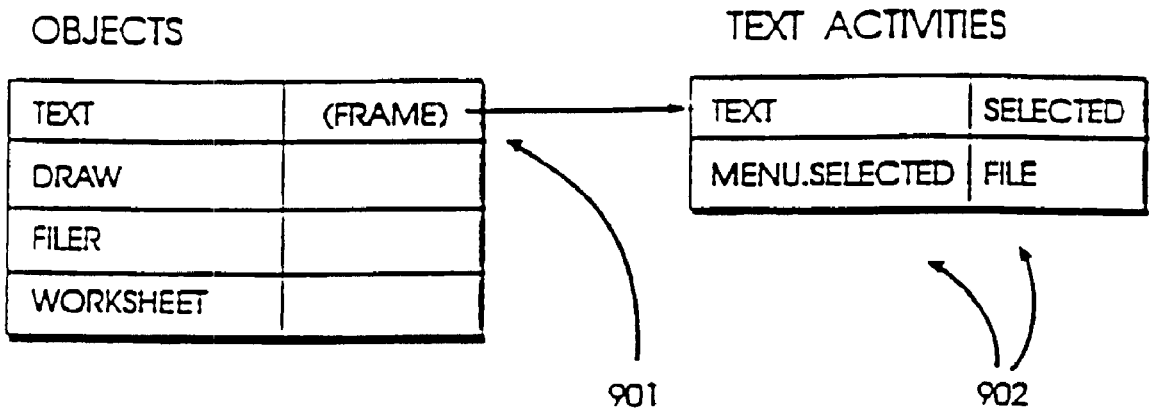
FIG. 9 illustrates frames and slots for the storage of knowledge.

The premise of each rule also contains formal or informal knowledge. The informal knowledge becomes formal when a rule fires successfully. The formal knowledge is stored in and accessed from knowledge base 330 in frame structures. Frames can be made up of other frames, which can also be shared. With this data structure, it is possible to access only the frame associated with the current state information when monitoring device 320 is updating the user's historical information. The frame's slots are like any linked list, except they represent actions and attributes of an object or concepts that the frames represent. Since frames indicate the relationship between a user's activity and the associated heuristics used to interpret that activity, it is easy to access only relevant information. FIG. 9 illustrates a frame 901 with its related slots 902.

Rule Classes 801 are made up of pointers to the variables and values in the frames. The slots which contain another frame are really another group within a rule class. In a frame-based reasoning system, one selects the frame to prove by filling in slot values. The slots contain the rules. The successful completion of a frame yields a solution.

```
BEGIN.RULECLASS
<id>
BEGIN.RULEGROUP
<id>
IF
( <variable> IS <value> )
( <Value> )
( NOT( <variable> IS <value> ))
( TEST (<variable> EQ <#> ))
THEN
( <value> )
END.RULEGROUP
END.RULECLASS
```

By way of illustration and not limitation, the rules may be coded as data structures (illustrated in the C language):

```
/*-------------------------------------------------------------------*/
/* Premise is a structure containing a single premise                */
/* of a rule. It is made up of the string itself, the type           */
/* of data it is, and the possible values it can hold.               */
/*-------------------------------------------------------------------*/
    struct Premise
        {
          char *pVar;
          char *pValueSet;
          char *pValue;
        };
/*-------------------------------------------------------------------*/
/* Premises is a structure for maintaining a linked                  */
/* list of all the premises (strings) in a single rule               */
/*-------------------------------------------------------------------*/
    struct Premises
        {
          struct Premise *pPremise;
          int Size;
          struct Premises *pNext;
        };
/*-------------------------------------------------------------------*/
/* RuleClass is a structure of all RuleGroups that can               */
/* associated with one another in searching                          */
/*-------------------------------------------------------------------*/
    struct RuleClass
        {
          struct RuleGroup *pRuleGroup;
          int NumberOfGroups;
          int ID;
          struct RuleClass *pNext;
        };
/*-------------------------------------------------------------------*/
/* RuleGroup is a structure containing all rules that                */
/* are considered to be associated in searching                      */
/*-------------------------------------------------------------------*/
    struct RuleGroup
        {
          struct Rules *pRules;
          int NumSubGroups;
          int Priority;
          struct RuleGroup *pNext;
        };
.N
/*-------------------------------------------------------------------*/
/* Rules is a structure containing all the rules within              */
/* a Rule Group. They can be singular or associated                  */
/* with one another.                                                 */
/*-------------------------------------------------------------------*/
    struct Rules
        {
          struct LinkedRules *pLinkedRules;
          char *pConclusion;
          struct Rules *pNext;
        };
/*-------------------------------------------------------------------*/
/* LinkedRules is a structure for maintaining a linked               */
/* list of rules which all have the same conclusion. A               */
/* rule is made up of premises (structure) a conclusion              */
/* (string) and a why statement (string) explaining                  */
/* why a rule succeeded.                                             */
/*-------------------------------------------------------------------*/
    struct LinkedRules
        {
          struct Premises *pAllPremises;
          struct LinkedRules *pNext;
        };
/*-------------------------------------------------------------------*/
/* Query is a structure for maintaining a linked list                */
/* of all the queries for information (strings) in the               */
/* knowledge base.                                                   */
/*-------------------------------------------------------------------*/
    struct Query
        {
          char *pFact;
          char *pAsk;
```

-continued

```
          char *pSet;
          struct Query *pNext;
        };
```

The inputs to knowledge base 330 are the data collected b monitoring device 320. The outputs of knowledge base 330 are data 331 and rules 334 which inference engine 340 selects for examination and help information text 336 which display engine 350 processes. Rules 334 are predefined by application developer. The frames indicate the relationship between the user's activity and the associated heuristics used to interpret that activity, thus making it easier to access only the information needed. The knowledge-based rules are structured so that obvious associations between rules can be incorporated within knowledge base 330 simplifying the design and the inferences from those rules.

Inference engine 340 interprets data 331 and rules 334 in knowledge base 330 to give a help solution to the user, or it intelligently asks for more information in order to obtain a solution. In the preferred embodiment, inference engine 340 operates using a backward-chaining method. This method starts with a goal state (a particular kind of help) and tries to prove it by reaching initial known data.

Figure 10A:
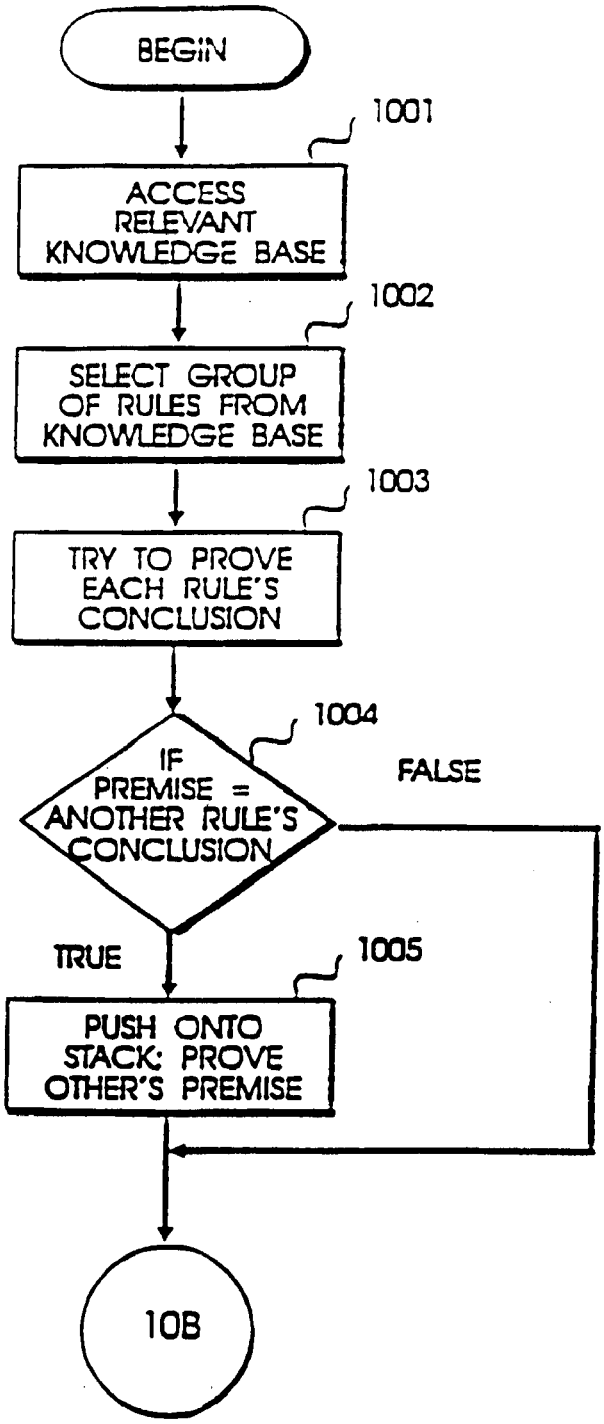
FIGS. 10A–B are a flow chart of the methods for proving rules.
Figure 10B:
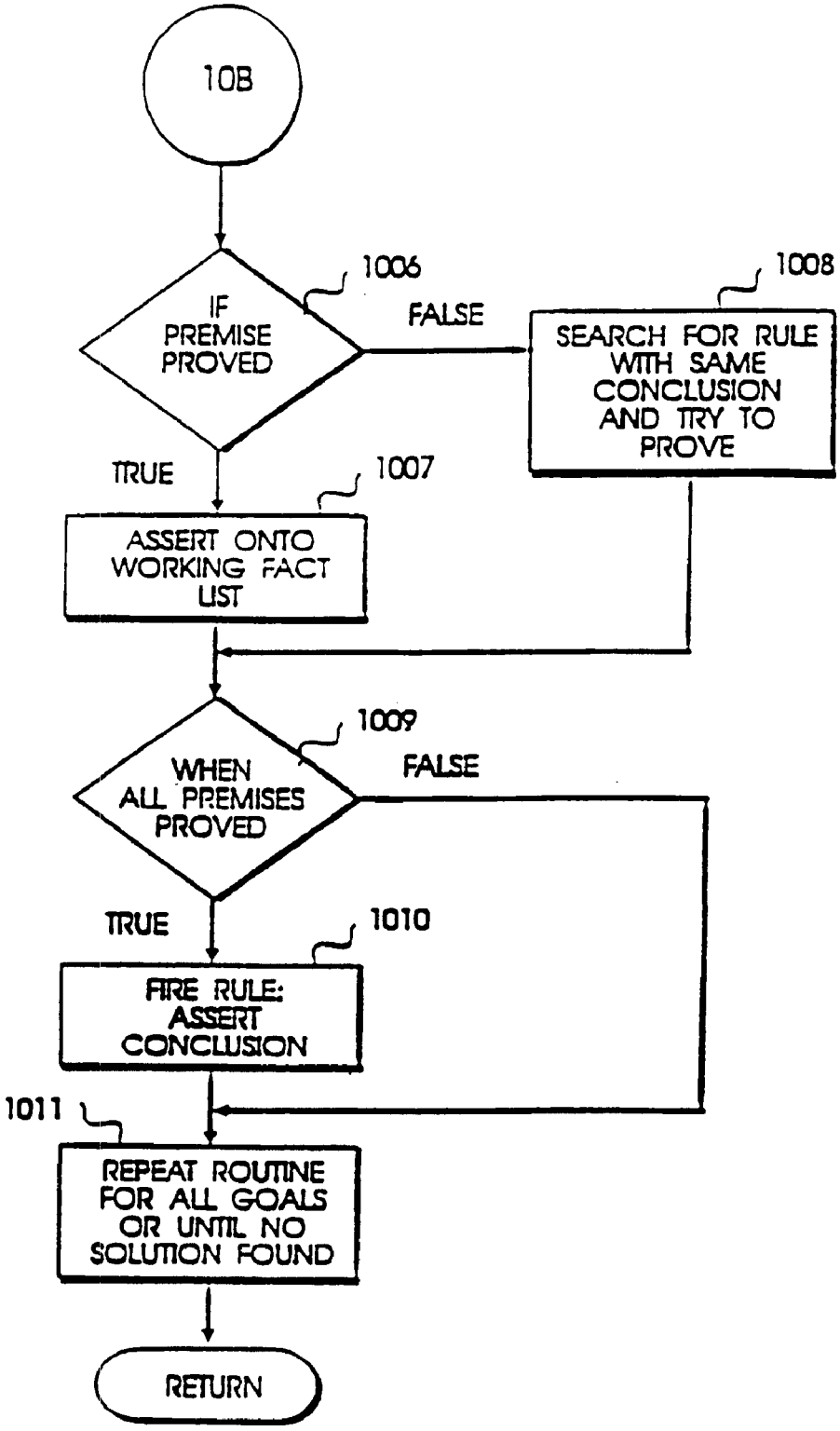

As FIGS. 10A–B illustrate, the steps used by inference engine 340 are as follows. In step 1001, knowledge base 330 is accessed according to the system state's level. In step 1002, depending on the system state, a group of rules (goal) is selected from knowledge base 330 and used as an hypothesis. Next in step 1003 an attempt is made to prove each rule's conclusion by proving its premise. If, in step 1004, the premise examined is the conclusion of another rule, it is pushed onto a stack (last-in first-out structure in system memory 103) and an attempt is made to prove the other rule's premise in step 1005. In step 1006, if a premise is proved, it is asserted into a working fact or data list at step 1007. Otherwise if the premise fails, a search is made in step 1008 for a rule with the same conclusion, which inference engine 340 will then try to prove. In step 1009, when all the premises in the rule have been proved, the rule has fired and the conclusion can be asserted at step 1010. In step 1011, this process is repeated until there are no more goal states to analyze or until no solution is found. In the latter case, knowledge base 330 is incomplete, therefore, inference engine 340 queries the user for more information or else explains to the user that no help is defined for the particular scenario.

The inputs to inference engine 340 are data 331 and rules 334 contained in knowledge base 330. Some of rules 334 control other knowledge bases which can be selected. Inference engine 340 first examines rules 334 to select the proper rule class 801. Since the groups 802 under the class 801 indicate if they are goal states, engine 340 can also indicate which rules will be used as hypotheses. Final output from inference engine 340 is a help "tag" that indicates a particular help solution. In addition, the engine creates a temporary output of data asserted while proving the rules.

Display engine 350 is an interface between the output of inference engine 340 and help text 336 giving the user easy access to the most useful help topics. Display engine 350 provides general to in-depth help to a user. It processes the inference engine's help tag to provide context-sensitive help. In addition, the help information itself has tags which are used by display engine 350 to locate further help information. This allows a user to select specific help from a subset of help information.

The help information data structure used by display engine 350 is defined for each application/accessory and system resource interfaces. Help that is repeated across multiple applications is divided into groups. The help information which is given is individualized for novice, intermediate, and advanced users. A display format is used which allows a user to select a single item of help from a suggested list, allow the user to continue selecting help until he wants to quit, and allow the user to search through the Help Topics for a particular topic.

The structure by which the help information is accessed and stored is classified according to application/accessory or system component (requires specific name identification, not type), experience level of user, kind (autodetect or user-invoked), and topic identifier. For example, a help structure (in C language) can be:

```
struct Help Source {
    int     Subject;
    int     Kind;
    int     HelpLevel;
    char    *pTopicString };
```

which can be filled by:

```
        Subject equal to TEXT_SUBSTITUTION
Kind    equal to AUTO
```

and pTopicString pointing to "Text Substitution."

Figure 11:
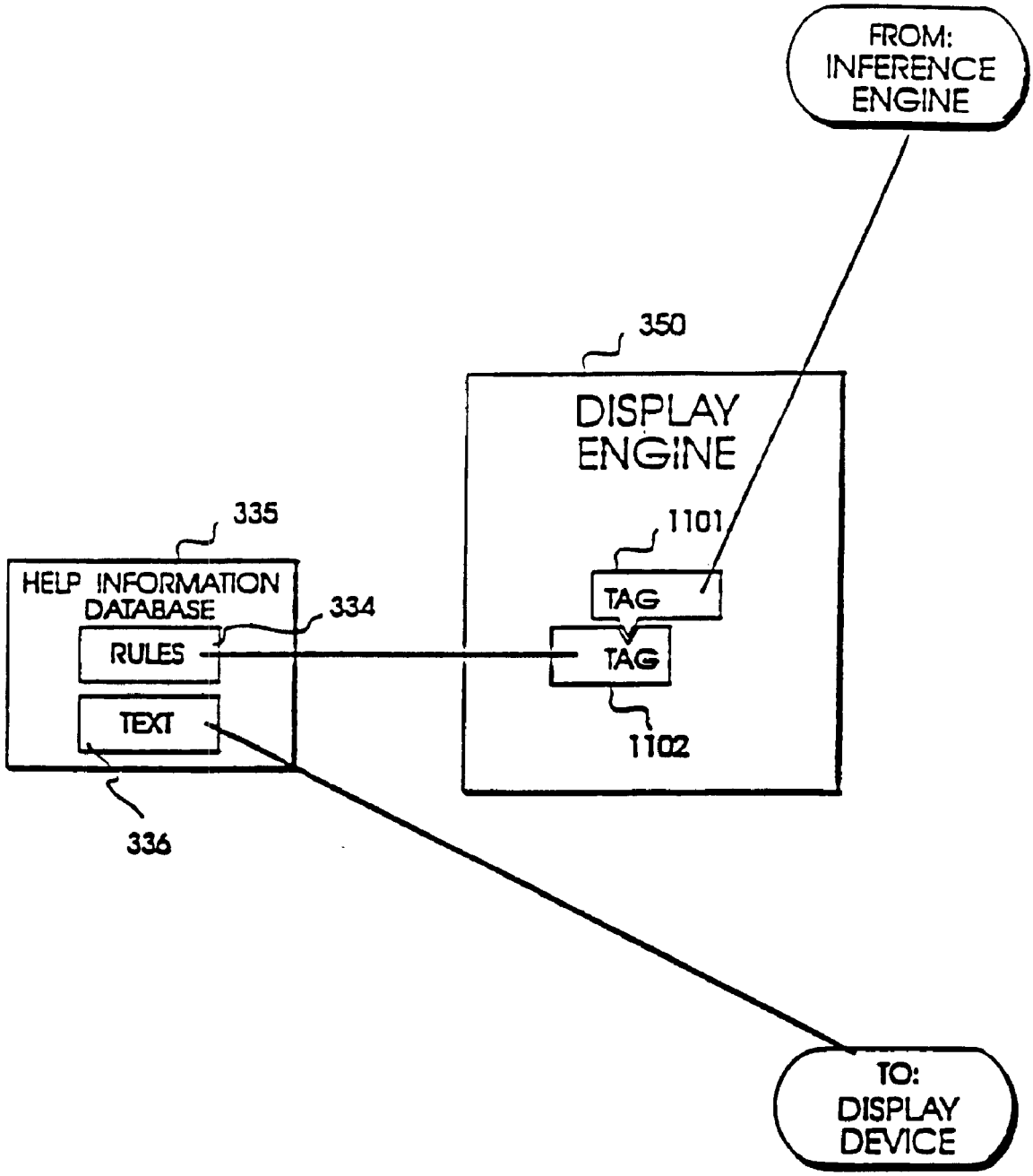

Referring to FIG. 11, the processing of help information in display engine 350 will now be described in detail. Help information database 335 is a database containing text 336 and rules 334 fields, i.e., help information text 336 is linked to help information rules 334. In addition, a tag 1102 is provided for representing the solution that a rule produces. Display engine 350 matches tag 1102 with a solution tag 1101 from inference engine 340. The corresponding text (from text 336) is the actual text sent as help information 360 to display device 105.

The organization of rules 334 is as follows. It contains the following fields: Grp, Rule#, PorC#, Var#, Var, Val, Bind, KeyW, and Q#. Grp is a rule group. Group 0 is always the group in which rules are placed that will give a solution. If these rules cause any other rules to fire, these rules are in another group. Rule# is the number of the rule. The rules are sorted by rule number, because one may want to try to fire one rule before another. PorC# is a premise or conclusion number. The records in the table are also sorted by PorC#. The conclusion is number 0 because it is the first thing pulled out of the table when inference engine 340 starts to fire a rule. (This is because it is doing backward chaining—start with the conclusion, and then prove the premises). Var# is an identifier for the engine to do faster searching. Each new variable added to the table has a unique identifier. The variables are DeskMate components, like a dialog box. Var, the variable field, is a string representing a variable for which a value is expected such as "running.cmp" (DISABLED FIELD). Value is the string field which contains a value. If the value is the current one for the variable, then the premise line succeeds. Bind is a binding variable. If a rule has a binding, the variable will bind to the currently known value of the variable. This eliminates repetition of rules that do the same exact thing. Only premises can bind. KeyW is a number indicating the negation (NOT) of a premise, or a TEST or CALL. TEST will do number comparisons, and assumes the value string field is a numerical value. CALL is used to execute a pre-defined function. The parameters of the function are placed in the value field. Q# is the number in queue 332 for which a premise line test applies. If the queue number equals 0, it is assumed the premise does not use predefined data.

While the invention is described in some detail with specific reference to a single preferred embodiment and certain alternatives, there is no intent to limit the invention to that particular embodiment or those specific alternatives. For example, one skilled in the art could implement such a help system in another interface environment or without any interface environment. Backward-chaining is but one of many possible AI techniques used to process data and rules, other possible techniques include forward-chaining and rule-value methods. Input device is not limited to a keyboard and a pointing device but contemplates any means by which data enters a computer, such as by voice recognition. Help information is not limited to a specific medium but instead includes any conveyance of help information, such as graphical representations. The true scope of the invention is defined not by the foregoing description but by the following claims.

What is claimed is:

[1. In a computer system, a method for aiding a user of a computer program, said method operating independent of said computer program, comprising the steps of:

storing a held information database;

monitoring a series of user-directed events from an input device;

generating data indicating said series of user-directed events;

storing said generated data in a knowledge base;

storing a plurality of rules for analyzing said generated data to determine appropriate help information;

detecting a request for help information from the user;

testing said rules against said generated data using an inference engine, whereby rules which are satisfied by said data are proved rules;

selecting in response to the proved rules appropriate help information from said help information database; and displaying said selected help information to the user.]

[2. The method of claim 1, wherein said monitoring step further comprises monitoring a system state.]

[3. The method of claim 2, wherein said monitoring a system state step further comprises monitoring a machine state, an application state, an accessory state, and a component state.]

[4. The method of claim 1, wherein said monitoring step further comprises the steps of:

registering an application's menubar;

checking if the user has requested help;

updating a state information; and updating a menubar.]

[5. The method of claim 1, wherein said testing step comprises the step of:

(a) selecting from said plurality of rules a first group of rules corresponding to a first plurality of user-directed events;

(b) attempting to prove each rule in said first group of rules;

(c) if a rule is proved, storing said rule as a proved rule in a plurality of proved rules; and (d) repeating steps (a)–(c) for a subsequent group of rules until a rule is proved.]

[6. The method of claim 5, wherein step (b) comprises attempting to match a premise with each of said first group of rules with said generated data.]

[7. The method of claim 5, wherein step (c) comprises:

if a rule is proved, storing said rule as a proved rule in a plurality of linked proved rules.]

[8. The method of claim 1, wherein said generating data step comprises generating an historical queue of said user-directed events.]

[9. The method of claim 1, wherein said rule storing step comprises storing premise-conclusion statements from said help information database.]

[10. The method of claim 1, wherein said displaying step comprises displaying textural help information to the user.]

[11. The method of claim 1, wherein said displaying step comprises displaying graphical help information to the user.]

[12. The method of claim 1, wherein said testing step comprises testing said rules against said generated data using a backward-chaining inference engine.]

[13. The method of claim 1, wherein said testing step comprises testing rules against said generated data using a forward-chaining inference engine.]

[14. In a computer system, a method for aiding a user of a computer program, said method operating independent of said computer program, comprising the steps of:

storing a help information database;

storing a knowledge base for maintaining data;

identifying a series of user-directed events;

comparing said identified series with data stored in the knowledge base;

if said identified series is unknown to said knowledge base, asserting in said knowledge base data for indicating said unknown identified series;

if said identified series contradicts said knowledge base, retracting in said knowledge base data which contradicts said identified series;

if said identified series is already known to said knowledge base, reasserting in said knowledge base data for indicating said already known identified series;

storing a plurality of rules for analyzing said knowledge base to determine appropriate help information;

detecting a request for help information from the user;

testing said rules against said knowledge from the user;

testing said rules against said knowledge base using an inference engine, whereby rules which are satisfied by data stored in the knowledge base are proved rules;

selecting in response to said testing step appropriate help information from said help information database; and displaying said selected help information to the user.]

[15. A help information system for aiding a user comprising:

a computer having a processor and a memory;

a display device coupled to said computer;

an input device coupled to said computer;

monitoring means coupled to the input device for monitoring a sequence of user-directed events and for generating data indicating said events;

a knowledge base coupled to said monitoring means and stored in said memory, said knowledge base comprising said generated data, a plurality of rules for analyzing said generated data to determine appropriate help information, and a help information database for storing said appropriate help information;

inference engine means, coupled to said knowledge base, for applying said rules to said data to generate an inference engine outputs and display engine means, coupled to said inference engine and coupled to said help information database, for interpreting said inference engine output to select appropriate help information for display by said display device to the user.]

[16. The system of claim 15, wherein said monitoring means further comprises means for monitoring a system state.]

[17. The system of claim 16, wherein said means for monitoring a system state comprises means for monitoring a machine state, an application state, an accessory state, and a component state.]

[18. The system of claim 15, wherein said monitoring means comprises means, stored in memory and operably coupled to the input device, for interpreting a series of user-directed events and performing a history update based on the series.]

[19. The system of claim 15, wherein said knowledge base further comprises an historical queue stored in memory and operably coupled to said generated data.]

[20. The system of claim 15, wherein said inference engine means comprises backward-chaining inference engine means.]

[21. The system of claim 15, wherein said inference engine means comprises forward-chaining inference engine means.]

[22. The system of claim 15, wherein said help information comprises textural help information.]

[23. The system of claim 15, wherein said help information comprises graphical help information.]

[24. A help information system for aiding a user comprising:

a computer having a processor and a memory;

an input device coupled to said computer;

a knowledge base, coupled to said memory, for maintaining data;

a plurality of rules, coupled to said memory, for analyzing said knowledge base;

means, coupled to said memory, for identifying a series of user-directed events from said input device;

means, coupled to said memory, for updating said knowledge base with said identified series;

means, coupled to said memory, for detecting a request for help information from the user;

a help information database, coupled to said memory, for selecting appropriate help information;

an inference engine, coupled to said memory, for testing said rules against said knowledge base to generate a help solution tag;

a display engine, coupled to said memory, for selecting help information from said help information database using said help solution tag; and a display for displaying said selected help information to the user.]

[25. The system of claim 24, wherein said means for updating said knowledge base comprises programming means for instructing said processor to perform the steps of:

comparing said identified series with data stored in the knowledge base;

if said identified series is unknown to said knowledge base, asserting data in said knowledge base data for indicating said unknown identified series;

if said identified series contradicts said knowledge base, retracting in said knowledge base data which contradicts said identified series; and if said identified series is already known to said knowledge base, reasserting in said knowledge base data for indicating said already known identified series.]

*26. In a computer system, a method for selecting help messages for aiding a user of a computer program comprising the steps of:*

*storing a help information database;*

*monitoring a series of user-directed events from an input device;*

*generating data indicating said series of use-directed events;*

*storing said generated data in a knowledge base;*

*testing said generated data against stored data, said stored data stored for the purpose of analyzing said generated data to determine appropriate help information;*

*storing a plurality of rules for analyzing said generated data to determine appropriate help information; and*

*using the data indicating said series of user-directed events stored in the knowledge base to select help information from said help information database;*

*wherein said using step further comprises using an inference engine to test said rules against the data stored in the knowledge base to select appropriate help information.*

*27. The method of claim 26, wherein said monitoring step further comprises monitoring a system state.*

*28. The method of claim 27, wherein said monitoring a system state step further comprises monitoring a machine state, an application state, an accessory state, and a component state.*

*29. The method of claim 26, wherein said monitoring step further comprises the steps of:*

*registering an application's menubar;*

*updating state information; and*

*updating a menubar.*

*30. The method of claim 26, wherein said generating data step comprises generating an historical queue of said user-directed events.*

*31. The method of claim 26, wherein said using step uses data indicating a series of user-directed events comprising at least two user-directed events.*

*32. The method of claim 26 or 31, wherein said series of user-directed events are events that are not necessarily related as being part of a particular command hierarchy.*

*33. A help information system for aiding a user of a computer program comprising:*

*a computer having a processor and a memory;*

*an output device coupled to said computer;*

*an input device coupled to said computer;*

*monitoring means coupled to the input device for monitoring a sequence of user-directed events and for generating data indicating said events;*

*a knowledge base coupled to said monitoring means and stored in said memory, said knowledge base comprising said generated data, a plurality of rules for analyzing said generated data to determine appropriate help information, and a help information database for storing said appropriate help information; and*

*inference engine means, coupled to said knowledge base, for applying said rules to said data to select appropriate help information for output by said output device to the user.*

*34. In a computer system, a method for aiding a user of a computer program comprising the steps of:*

*storing a help information database;*

*monitoring a series of user-directed events from an input device;*

*generating data indicating said series of user-directed events;*

*storing said generated data in a knowledge base;*

*storing a plurality of rules for analyzing said generated data to determine appropriate help information;*

*testing said rules against said generated data using an inference engine, whereby rules which are satisfied by said data are proved rules;*

*selecting in response to the proved rules appropriate help information from said help information database; and*

*displaying said selected help information to the user.*

*35. The method of claim 34 or 47, wherein said monitoring step further comprises monitoring a system state.*

*36. The method of claim 35, wherein said monitoring a system state step further comprises monitoring a machine state, an application state, an accessory state, and a component state.*

*37. The method of claim 34 or 47, wherein said monitoring step further comprises the steps of:*

*registering an application's menubar;*

*updating a state information; and*

*updating a menubar.*

*38. The method of claim 34 or 47, wherein said testing step comprises the steps of:*

*(a) selecting from said plurality of rules a first group of rules corresponding to a first plurality of user-directed events;*

*(b) attempting to prove each rule in said first group of rules;*

*(c) if a rule is proved, storing said rule as a proved rule in a plurality of proved rules; and*

*(d) repeating steps (a)–(c) for a subsequent group of rules until a rule is proved.*

*39. The method of claim 38, wherein step (b) comprises attempting to match a premise with each of said first group of rules with said generated data.*

*40. The method of claim 38, wherein step (c) comprises:*

*if a rule is proved, storing said rule as a proved rule in a plurality of linked proved rules.*

*41. The method of claim 34 or 47, wherein said generating data step comprises generating an historical queue of said user-directed events.*

*42. The method of claim 34 or 47, wherein said rule storing step comprises storing premise-conclusion statements from said help information database.*

*43. The method of claim 34 or 47, wherein said displaying step comprises displaying textural help information to the user.*

*44. The method of claim 34 or 47, wherein said displaying step comprises displaying graphical help information to the user.*

*45. The method of claim 34 or 47, wherein said testing step comprises testing said rules against said generated data using a backward-chaining inference engine.*

*46. The method of claim 34 or 47, wherein said testing step comprises testing rules against said generated data using a forward-chaining inference engine.*

*47. In a computer system, a method for aiding a user of a computer program comprising the steps of:*

*storing a help information database;*

*monitoring a series of user-directed events from an input device;*

*generating data indicating said series of user-directed events;*

*storing said generated data in a knowledge base;*

*storing a plurality of rules for analyzing said generated data to determine appropriate help information;*

*detecting a request for help information from the user;*

*testing said rules against said generated data using an inference engine, whereby rules which are satisfied by said data are proved rules;*

*selecting in response to the proved rules appropriate help information from said help information database; and*

*displaying said selected help information to the user.*

*48. In a computer system, a method for aiding a user of a computer program comprising the steps of:*

*storing a help information database;*

*storing a knowledge base for maintaining data;*

*identifying a series of user-directed events;*

*comparing said identified series with data stored in the knowledge base;*

*if said identified series is unknown to said knowledge base, asserting in said knowledge base data for indicating said unknown identified series;*

*if said identified series contradicts said knowledge base, retracting in said knowledge base data which contradicts said identified series;*

*if said identified series is already known to said knowledge base, reasserting in said knowledge base data for indicating said already known identified series;*

*storing a plurality of rules for analyzing said knowledge base to determine appropriate help information;*

*testing said rules against said knowledge from the user;*

*testing said rules against said knowledge base using an inference engine, whereby rules which are satisfied by data stored in the knowledge base are proved rules;*

*selecting in response to said testing step appropriate help information from said help information database;*

*and displaying said selected help information to the user.*

* * * * *

UNITED STATES PATENT AND TRADEMARK OFFICE

CERTIFICATE OF CORRECTION

PATENT NO. : RE 39,302 E
APPLICATION NO. : 09/375867
DATED : September 19, 2006
INVENTOR(S) : Charles D. Lanier, Richard J. Wolf and Leticia Vill Butner It is certified that error appears in the above-identified patent and that said Letters Patent is hereby corrected as shown below:

Title Page, Item (73) please delete "Suwon" and insert -- Suwon City, Kyungki-Do --, therefor.

Title Page, Item (56) OTHER PUB., Page 2, Reference, Visual Prog. please delete "Dimeensional" and insert -- Dimensional --; and please delete " 19885. " and insert -- 1985 .--, therefor.

Col. 16, Ln 57, in Claim 43, please delete "textural" and insert -- textual --, therefor.

Signed and Sealed this

Twelfth Day of June, 2007

JON W. DUDAS
*Director of the United States Patent and Trademark Office*